(12) United States Patent
Stone

(10) Patent No.: US 7,428,106 B1
(45) Date of Patent: Sep. 23, 2008

(54) OPTICAL FIELD FLATTENERS

(75) Inventor: Thomas W. Stone, Hellertown, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 260 days.

(21) Appl. No.: 11/251,401

(22) Filed: Oct. 14, 2005

Related U.S. Application Data (60) Provisional application No. 60/619,399, filed on Oct. 14, 2004.

(51) Int. Cl.
  *G02B 3/00* (2006.01)
(52) U.S. Cl. .................................. 359/652; 359/648
(58) Field of Classification Search ......... 359/648–651, 359/652–654
  See application file for complete search history.

(56) References Cited

U.S. PATENT DOCUMENTS

| | | | |
|---|---|---|---|
| 4,331,380 A | 5/1982 | Rees et al. | |
| 4,447,126 A | 5/1984 | Heidrich et al. | |
| 4,589,736 A * | 5/1986 | Harrigan et al. | ............. 359/652 |
| 4,852,982 A | 8/1989 | Yamamoto et al. | |
| 6,941,041 B2 * | 9/2005 | Yamaguchi et al. | ........... 385/34 |

FOREIGN PATENT DOCUMENTS

| | | |
|---|---|---|
| EP | 0316507 B1 | 12/1993 |
| JP | 25338341 A | 12/2005 |

OTHER PUBLICATIONS

U.S. Appl. No. 60/619,399, filed Oct. 14, 2004. Thomas W. Stone. Optical Field Flatteners.
U.S. Appl. No. 11/407,764, filed Apr. 20, 2006. Inventors: Thomas A. Mitchell et al. Optical Field Flatteners and Converters.

* cited by examiner

*Primary Examiner*—Scott J Sugarman
(74) *Attorney, Agent, or Firm*—Burns & Levinson LLP; Jacob N. Erlich; Orlando Lopez (57) ABSTRACT

Field flatteners that can correct large field curvatures.

23 Claims, 12 Drawing Sheets

OPTICAL FIELD FLATTENERS

CROSS REFERENCE TO RELATED APPLICATIONS

This application claims priority of U.S. Provisional Application 60/619,399 entitled "OPTICAL FIELD FLATTENERS," filed on Oct. 14, 2004, which is incorporated by reference herein.

STATEMENT REGARDING FEDERALLY SPONSORED RESEARCH OR DEVELOPMENT

This invention was made [partially] with U.S. Government support from the U.S. Air Force Wright Laboratory under contract F33615-98-C-1269. The U.S. Government has certain rights in the invention.

BACKGROUND OF THE INVENTION

This invention relates generally to optical field flatteners.

Optical systems naturally image on curved focal "planes" (focal loci). The human eye makes use of a curved retina that is, to first order, conformal with the image surface formed by the cornea and the lens. There are some well established techniques, discussed below, for flattening the image surface of an optical system, but these techniques use up degrees of freedom in the optical design (i.e., thus increasing optical system complexity) and/or use the addition of a corrector plate near the image surface. In high performance systems such as hyperspectral sensors and ultra-wide field imagers, the field curvature problem is difficult for conventional field flattening technology.

Diffractive optical elements take many forms which may be used as the dispersive elements in hyperspectral sensors. These angularly dispersive elements include, among others, a) reflection and transmission gratings, and b) diffractive elements with optical power such as holographic and binary (lithographically fabricated surface relief) lenses. Use of these and other dispersive elements typically results in strongly curved focal loci, as shown in the extreme example of FIG. 1.

Figure 1:
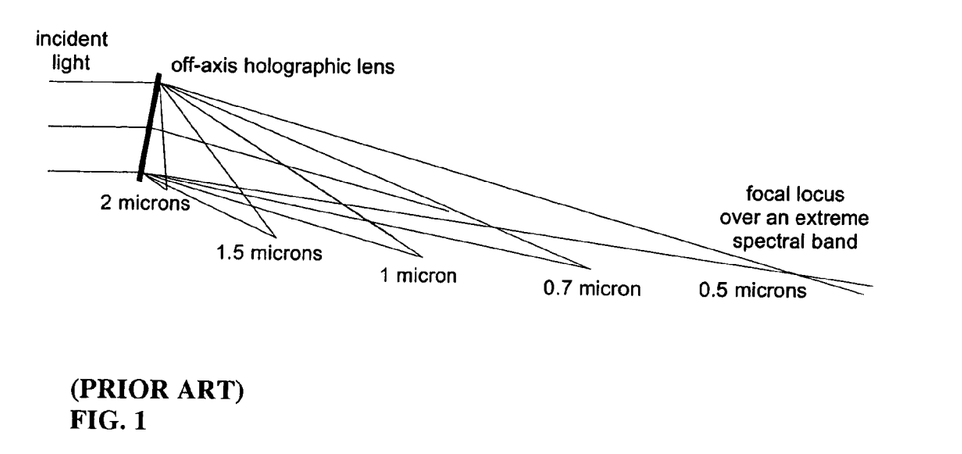
FIG. 1 is a schematic representation of a conventional system illustrating Curved Field Problem in Highly Dispersive Systems.

The focal surface of the off-axis holographic lens of FIG. 1 is used to illustrate an extreme case where the dispersion over an ultra-wide band (0.5-2 microns) forms a focal locus that is both strongly curved and extended.

In FIG. 1, an off-axis diffractive lens is used to focus and disperse an incident wave that emanates from a distant axial point. It is apparent the focal locus spanning wavelengths from 0.5 to 2 microns is both curved and extended.

Applicable detector arrays including CCDs and Multiple Quantum Well (MQW) structures, however, are for the most part tightly constrained to planar geometries due to the inherent lithographic and epitaxial fabrication technologies. The strongly curved focal planes are a pronounced mismatch with the planar detector arrays, particularly over large fields. This mismatch is illustrated in FIG. 2, and is the basis of a significant technical problem which evades classic solutions, as described below.

Figure 2:
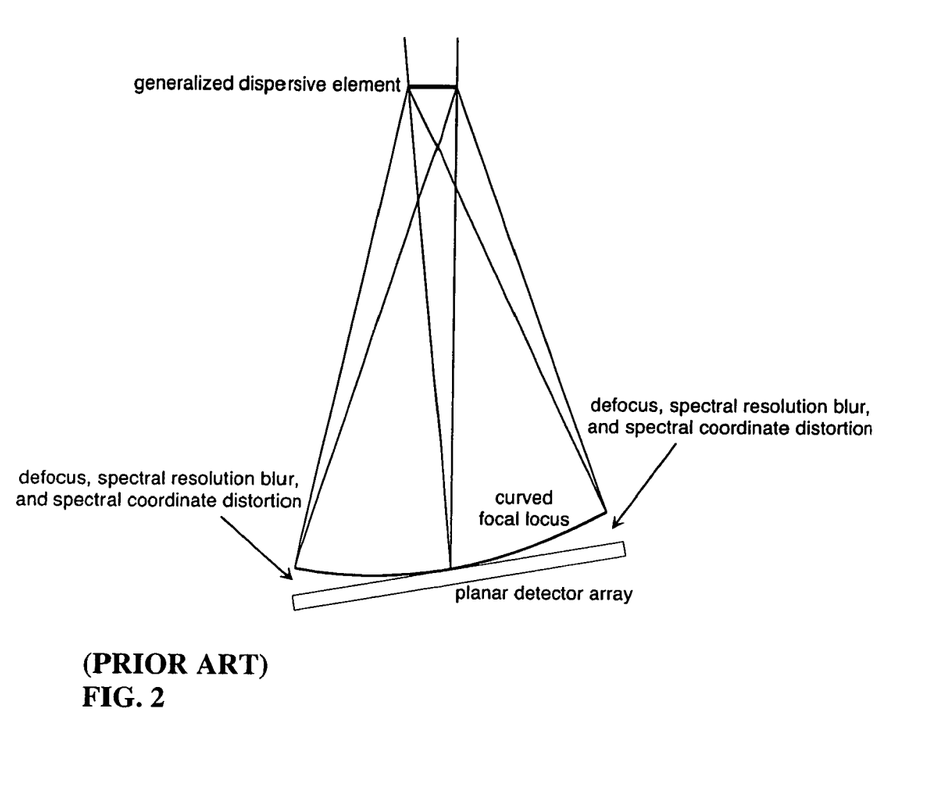
FIG. 2 is a schematic representation of a conventional system illustrating Curved Field Problem in Hyperspectral Sensing.

As shown in FIG. 2, the focal surface is strongly curved by the dispersive elements that are used in systems including hyperspectral sensors. Yet solid state detector arrays (e.g., CCD's and MQW device arrays) are inherently planar. This mismatch results in field-dependent defocus, spectral resolution blur, and spectral coordinate distortion that is too large to be corrected by conventional Piazzi-Smyth type optical field flatteners.

The classic approach to compensate for this fundamental mismatch is to make use of refractive solutions in lens design, chiefly the technique originating in 1872 with C. Piazzi-Smyth in which a negative field lens is placed adjacent to the image plane. When a lens is placed near a focal plane it makes little contribution of optical power, but as evidenced by the Petzval Theorem it can have a pronounced effect on the field curvature. This Piazzi-Smyth field flattener is a standard tool used in reducing the mismatch between curved image planes and planar detectors such as the classic photographic plates and solid state detector arrays. While this refractive field flattener approach is effective for the types of field curvatures formed in typical lens systems, it is not capable of correcting the large field curvatures generated in long relay systems or the strong curvatures generated by many dispersive elements in hyperspectral applications as discussed above.

There is therefore a need to provide field flatteners that can correct large field curvatures.

BRIEF SUMMARY OF THE INVENTION

One embodiment of the method of this invention includes the steps of steps of receiving the electromagnetic radiation at a receiving surface of an array of gradient index rod lenses, selecting at least one characteristic of each gradient index rod lens from the array of gradient index rod lenses in order to image a focal locus of the received electromagnetic radiation onto a focal locus of an image surface, and imaging the received electromagnetic radiation onto the image surface, wherein characteristics of each gradient index rod lens include a length, an index gradient, and a width.

Systems implementing embodiments of the method of this invention are also disclosed.

BRIEF DESCRIPTION OF THE SEVERAL VIEWS OF THE DRAWING

For a better understanding of the present invention, together with other and further needs thereof, reference is made to the accompanying drawings and detailed description and its scope will be pointed out in the appended claims.

DETAILED DESCRIPTION OF THE INVENTION

The Gradient Rod Array Field Flattener of this invention, labeled here with the acronym GRAFF for brevity, is described hereinbelow. Many system variations on this canonical GRAFF device, and related design issues, are also described hereinbelow.

Figure 3:
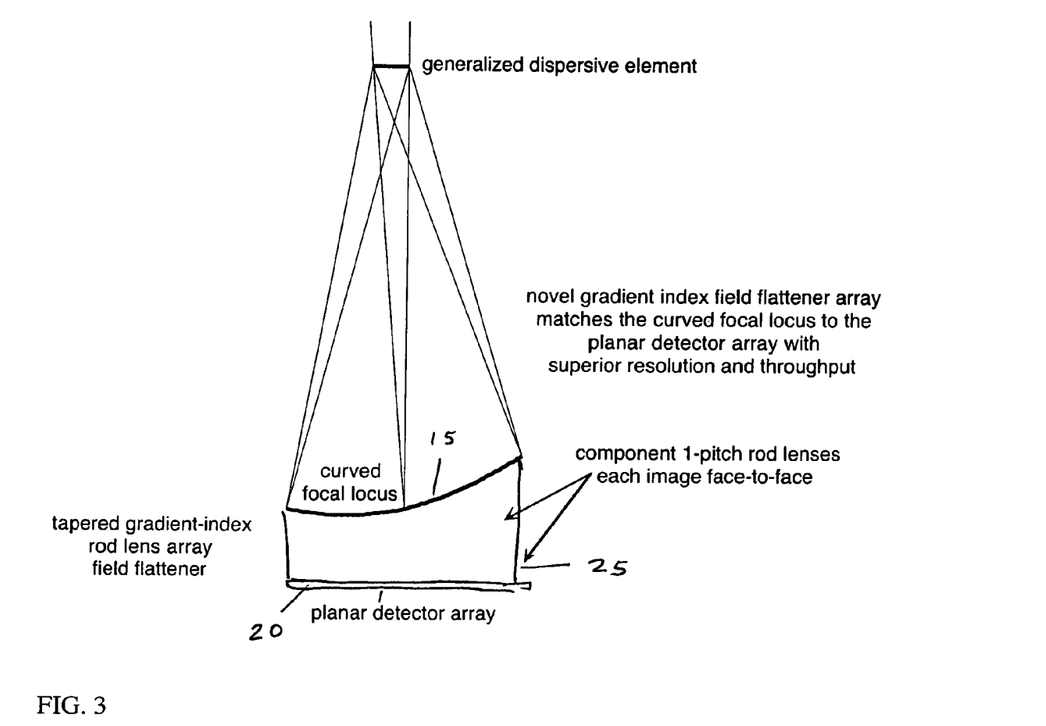
FIG. 3 is a schematic representation of an embodiment of this invention.

In one embodiment of this invention, Gradient index rod lenses are used to bridge the gap between the strongly curved focal locus and the planar detector array. Gradient index rod lenses, exactly as with gradient index optical fibers, are dielectric cylinders with a parabolic or more complex radial variation of refractive index which causes the incident light to propagate in sinusoidal trajectories inside the element. In the configuration of FIG. 3, each of the rod lenses in the array is chosen with the appropriate length so that one face is coupled to the planar detector array and the other face is adjacent to its local subfield in the focal locus. The gradient profile of each of the rod lenses is also designed or modified so that the rod maintains an integer-pitch characteristic, i.e., so that it images from face to face with unity magnification and no inversion. The width of the rod lenses can be varied from a fraction of a millimeter to several millimeters, as required to keep the small local field sag within the depth of focus of the local rod lens. Further, many potential degrees of freedom exist for high order optimization of the technology. For example, since the wavelength is varying with field position in hyperspectral applications, the chromatic "aberration" of the rod lenses can be used to match in whole, or in part, this local sag and further improve performance. Angled facet compensation can also be used to optimize performance. These and other design and optimization techniques, as well as other configurations, are described hereinbelow.

Referring to FIG. 3, the mismatch between the curved focal locus 15 and planar detector 20 is bridged using tapered arrays 25 of varying length integral-pitch gradient index rod lenses, each of which images a local subfield directly onto the planar detector with unity magnification and no inversion. While related to gradient index fibers, gradient index rod lenses image local subfields with nearly continuous high resolution (not sampled), reduced coupling loss, and no cladding region dead space. The depth of focus for each rod lens is sufficient to image the local curved subfield onto the detector, and a variety of compensation techniques are discussed hereinbelow to further optimize higher order performance.

The propagation through a rod lens is governed by the same principles as through a graded fiber, and the transition from fiber to rod lens is a smooth one. However, by increasing the diameter of the fiber to form the rod, and by relating the gradient constant to the rod dimensions, continuous imaging of a substantial subfield region can be obtained. Here the resolution is not impaired by a sampling function where many tiny fibers are used to individually relay the focal locus to the detector, pixel by pixel or several pixels at a time. The apparatus of this invention adds the component of free-space imaging of local focal regions, and the elements may be ground into tileable shapes.

Figure 4:
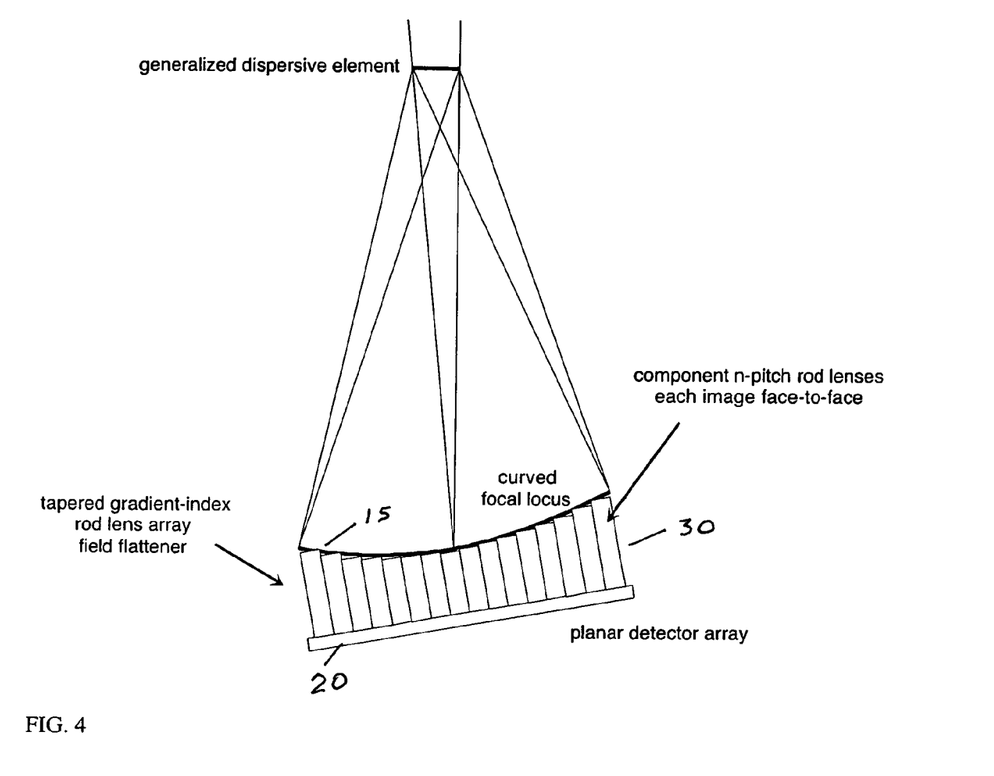
FIG. 4 is a schematic representation of another embodiment of this invention.

An embodiment of a Gradient Rod Array Field Flattener (GRAFF) of this invention is illustrated in FIG. 4. Using this embodiment, the strongly curved dispersion focal loci typical in wide angle hyperspectral sensors are relayed to a planar detector in a number of continuous high resolution subfield imaging steps—each with the use of an optimized rod lens.

Referring to FIG. 4, the hyperspectral dispersive element forms a focal plane 15 that is so strongly curved it cannot be directly imaged on a planar detector array 20. The GRAFF uses tapered arrays 30 of varying length gradient index rod lenses, each of which is typically several millimeters in diameter, to image local subfields directly onto the planar detector with unit magnification and no inversion. Each rod lens provides continuous high resolution imaging (not sampled), small insertion loss, and no cladding region dead space. The mismatch between the curved focal locus and the planar detector is bridged using arrays of varying length integral-pitch gradient index rod lenses.

In order to provide background for the embodiments of this invention, conventional Gradient Lenses are discussed below. Gradient index rod lenses are dielectric cylinders with a parabolic or more complex radial variation of refractive index which causes the incident light to propagate in sinusoidal trajectories inside the element. These elements are typically made by single or double ion-exchange processes, where for example, sodium and silver ions are exchanged by immersing the rod in molten salt baths of sodium nitrate and silver nitrate. A parabolic profile of silver ion concentration, with a maximum on the cylinder axis, is a simple useful profile and results in sinusoidal ray propagation. The parabolic refractive index dependence n(r) is characterized by the relation:

$$n(r) = n_0\left(1 - \frac{A}{2}r^2\right),$$

where r is the radial coordinate along the cylinder, $n_0$ is the axial refractive index, and the gradient constant is given by $\sqrt{A}$. Higher order terms, varying with even powers of r, are included to examine higher order aberrations and image quality. Raytracing through these elements is a straightforward process.

The length of a gradient index rod lens is typically described in relation to the gradient constant in terms of its pitch, where 1 pitch is the length required for a given lens to complete one complete sinusoidal ray path. By selecting the pitch of the element (the length in relation with the gradient profile) these elements can be used to image infinite conjugates or finite conjugates. In the latter case, when the pitch is an integer, the conjugate image planes can be the end facets of the rod itself. In such an element the rod acts to relay the image from one face to the other with unity magnification and with no inversion.

Other common pitches include 0.5 pitch which images from face to face but with inversion, and 0.25 pitch which images from infinity to an end face of the rod. Rod lenses with integer n>1 pitches will each still image from face to face, but will produce n−1 erect internal images along the rod. As discussed later, a family of 1-pitch rods with varying length can be obtained by slightly varying the gradient constant in the element.

Figure 5:
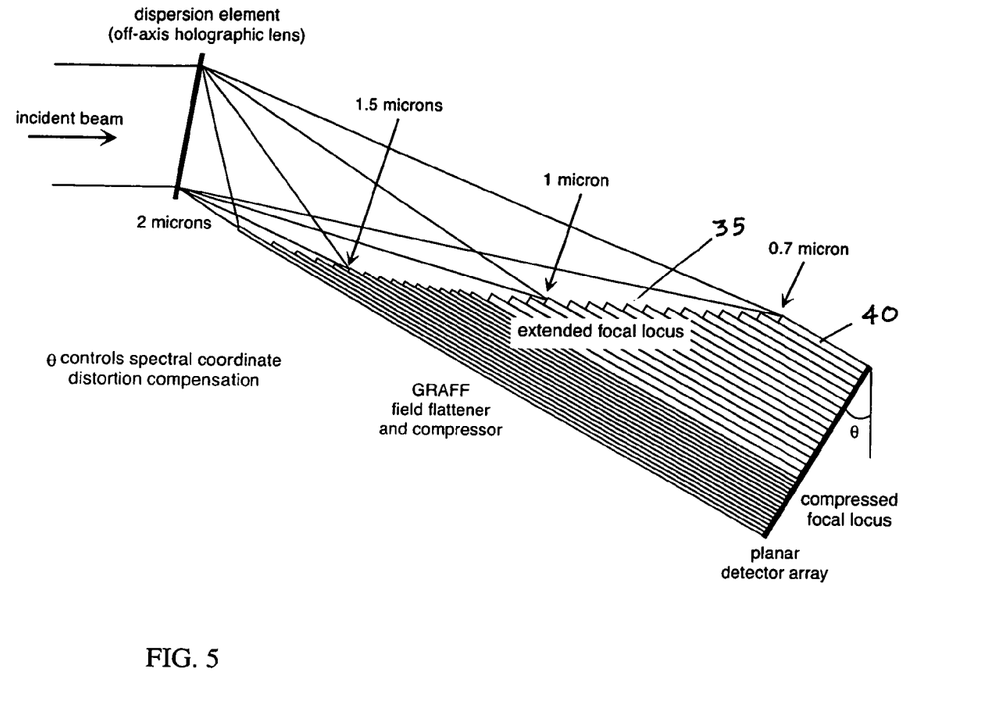
FIG. 5 is a schematic representation of yet another embodiment of this invention.

An embodiment of the GRAFF of this invention can be used to partially compensate for spectral distortions and to compress the field of highly dispersive elements, as shown in FIG. 5. In FIG. 5, the curved and tilted diffractive locus 35 of an off-axis holographic lens (which can be multiplexed to preserve diffraction efficiency over such a large band) is plotted to scale and is used to demonstrate these functions.

In the embodiment of FIG. 5, the field of an extreme bandwidth diffractive lens, plotted for the range of 0.7 μm to 2.0 μm, is used as an example to demonstrate both flattened and laterally compressed fields using a GRAFF. The diffractive lens dispersion is plotted to scale. The extreme tilt and curvature are readily corrected with rod lenses 40, which are available off-the-shelf at lengths of tens of centimeters. Further, by tilting the detector plane angle, spectral distortions can be compensated, and a wide spectral field such as this can be greatly compressed, thus reducing the required extent of the detector array.

By translating, and by rotating the detector plane (to vary θ as shown in FIG. 5), a broad range in spatial mappings of wavelength to position can be obtained on the detector. These translations and rotations can greatly compress the spectral field extent (reducing the required detector array size) as well as potentially providing a partial compensation of spectral distortions. The large range in rod lens length is not necessarily a limit, since they are available off-the-shelf in lengths exceeding a foot or more.

Figure 6:
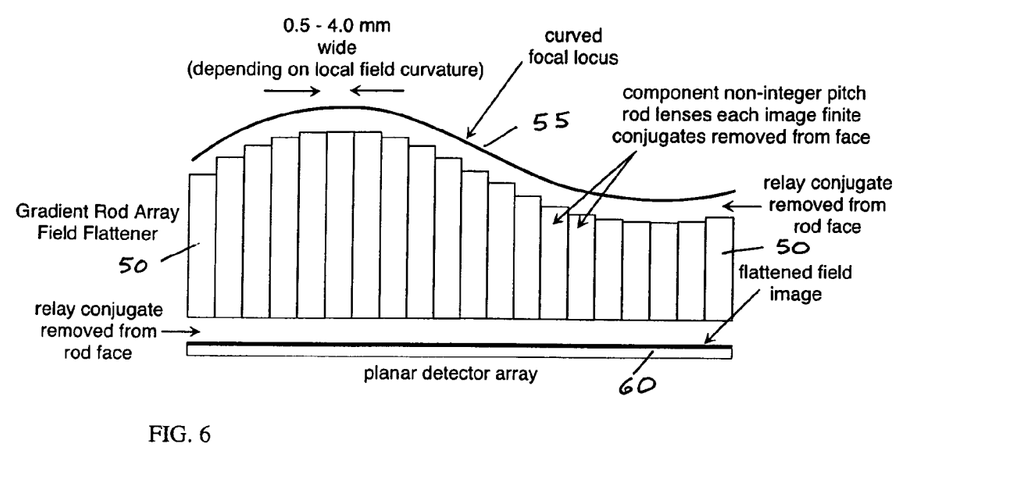
FIG. 6 is a schematic representation of a further embodiment of this invention.

Non-integral pitches can be selected for the rod lenses (50, FIG. 6) so that they image conjugates which are slightly removed form the rod end faces. This system variation is illustrated in FIG. 6, and can be advantageous for eliminating deleterious effects of contamination on the optical surfaces as well as removing "blind spots" which could occur at neighboring rod interfaces and due to imperfect fill fractions or reductions in element numerical aperture at boundary regions. In effect, this configuration may be useful for blurring out the boundaries of the shaped gradient index rod lenses 50.

In the embodiment of FIG. 6, the rod lenses 50 relay the curved focal locus 55 to the planar detector array 60 with conjugates that are placed a small distance off the end of the respective rod end facets. Surface scratches and contamination are defocused and blind interfaces can be greatly reduced or eliminated.

Figure 7:
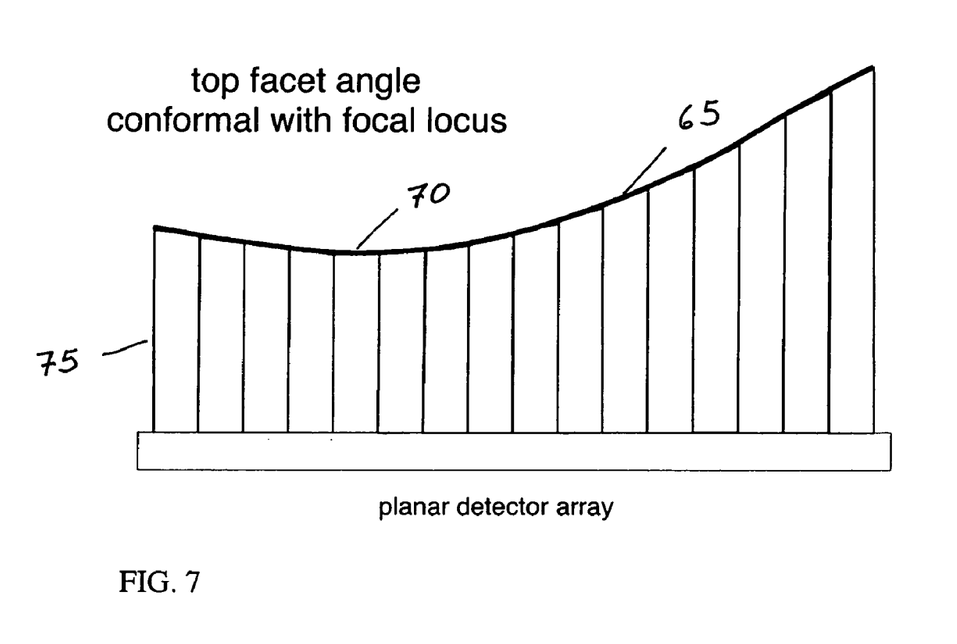
FIG. 7 is a schematic representation of yet a further embodiment of this invention.

The stepped element faces near the curved hyperspectral image can be ground to approximate the shape of the focal locus. The result is a conformal configuration in which there is no shadowing in the region of the element interfaces. This is illustrated below in FIG. 7. In this embodiment the end facets 70 of the GRAFF 75 are ground and polished to match the curved focal locus 65.

Figure 8:
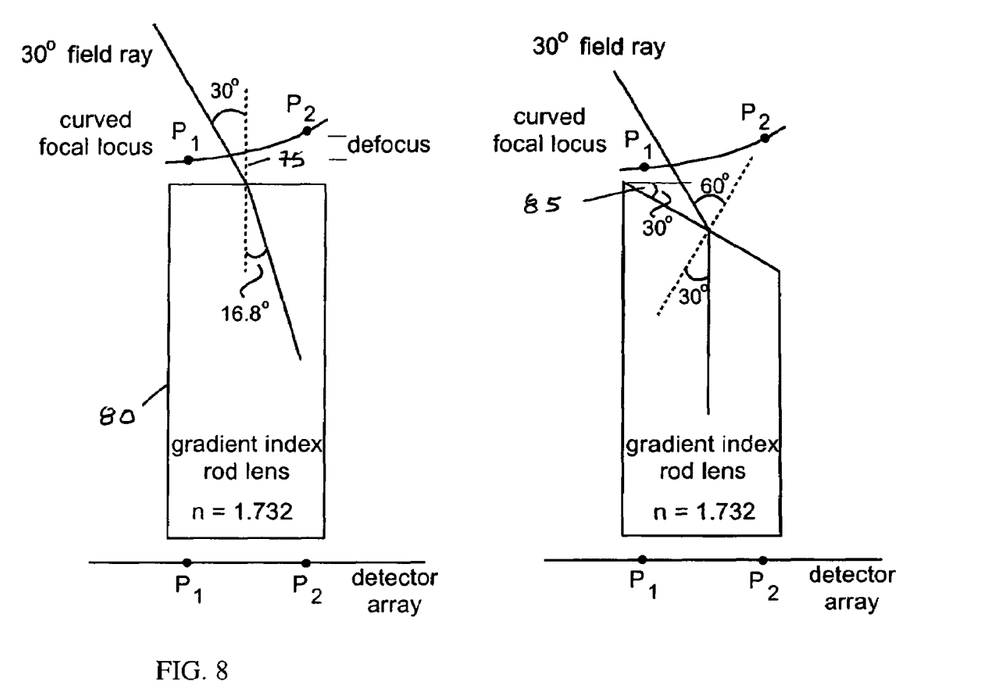
FIGS. 8a, 8b are schematic representations of still a further embodiment of this invention.

In an alternate embodiment, the facets are angled to refract the chief ray towards the axis of the local rod lens, as illustrated in FIGS. 8a, 8b (towards as used herein refers to a refraction or deflection that brings the direction closer to or along a direction). Here the chief ray biases the instrument field off the rod lens axis near the edge of the GRAFF. The resultant field clipping is shown in FIG. 8a, where a 30-degree field ray is severely biased off the axis 75 of the local rod lens 80. This biasing is deleterious since transmission is reduced spatially across the rod face, and additionally since the cone of rays about the chief ray are more heavily attenuated and clipped to the extreme side (numerical aperture clipping). This biasing of the field off the axis, and resultant numerical aperture clipping, can be greatly reduced by tilting or shaping the facet angle 85 as shown in FIG. 8b. In this compensated case, the same 30-degree field ray that was severely biased off axis is restored to an axial condition where a larger surrounding numerical aperture about the ray can be transmitted. Thus the field induced off-axis biasing (left) can be compensated and biased back on-axis by proper choice of a facet angle 85. This can maintain throughput at wide instrument field angles.

In one embodiment, the axial refractive index (n=1.7832) for the rod is chosen so that the desired facet angle is 30 degrees.

Referring to FIG. 8a, the chief ray biases the instrument field off-axis near the edge of the GRAFF. The resultant field clipping can be greatly reduced by tilting or shaping the facet angle 85. Here a 30-degree field ray results in a reduced field (left) but can be compensated and biased back on-axis by proper choice of a facet angle (right). This is one embodiment of "re-axialization" across the field.

In a related embodiment to the facet angle tuning described above, the rods themselves may be bent to keep the facet face approximately normal to the local chief ray. This is illustrated in FIG. 9, and can result in the maintenance of large throughputs at very wide field angles across the hyperspectral focal locus.

Figure 9:
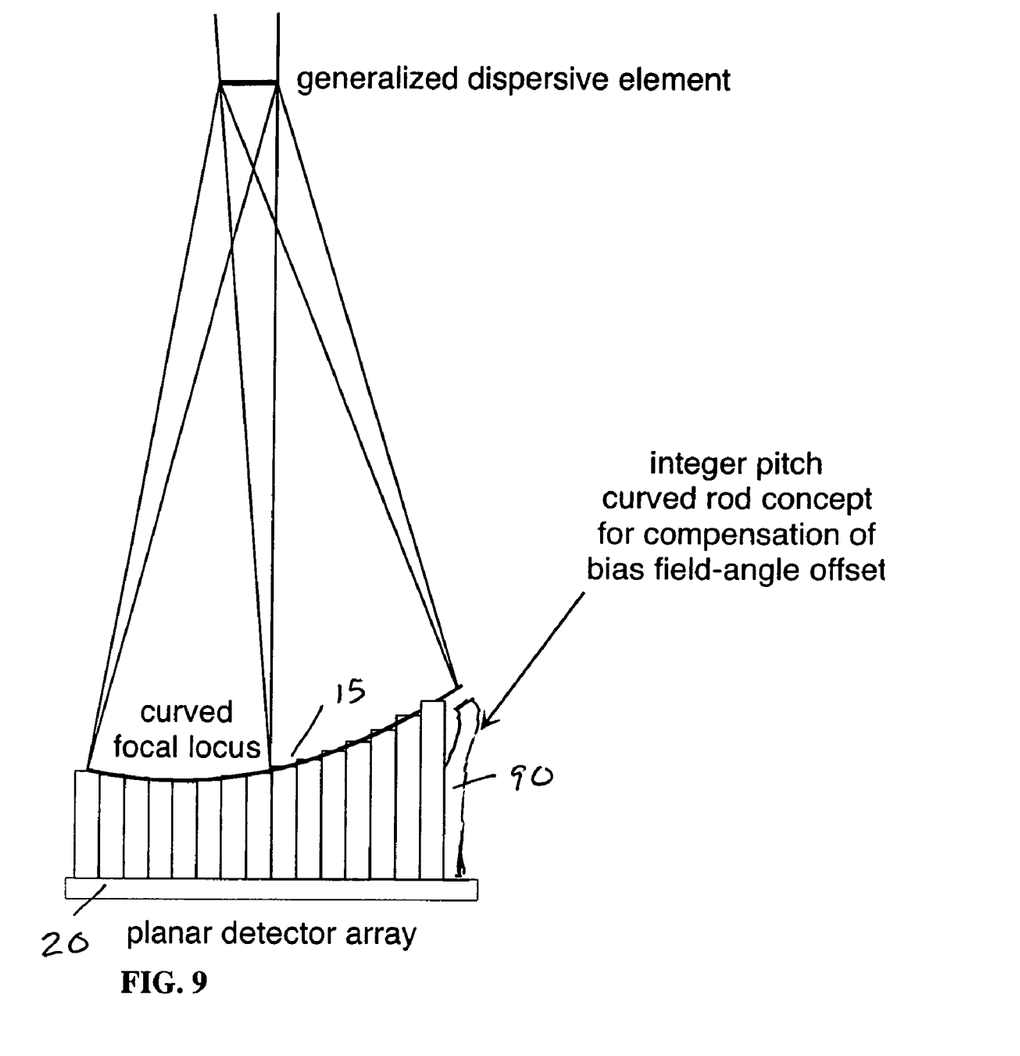
FIG. 9 is a schematic representation of one more embodiment of this invention.

An alternative to facet angle shaping is the curving of rod lenses (such as rod lens 90, FIG. 9) across the field to maintain their entrance surfaces normal to the local chief ray, shown in FIG. 9. This is a second form of "re-axialization" across the field.

Figure 10:
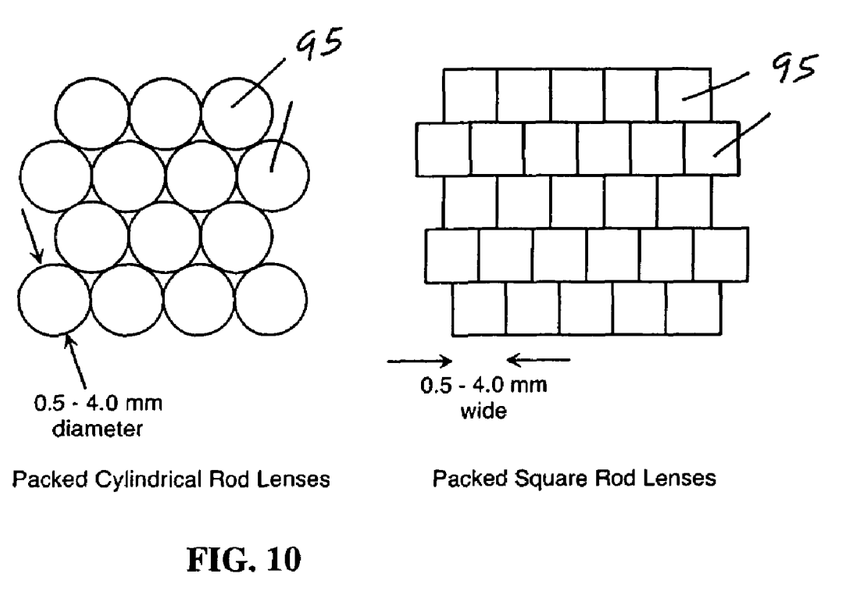
FIG. 10 is a schematic representation of Packing Densities for an embodiment of this invention.

The packing of circular rod lenses 95 gives rise to fill fractions much less than unity, as shown in the left half of FIG. 10. In the space filling configurations, the rod lenses can be ground to tileable polygons or shapes (e.g., squares, hexagons, or triangles) and used to tile a wide 1-dimensional or large area 2-dimensional focal region with greatly improved fill fractions. This embodiment is illustrated in the right half of FIG. 10. As shown in FIG. 10, dead space between circular rod lenses can be eliminated with triangular, rectangular, or hexagonal packing.

In one embodiment of the method of fabricating GRAFF field flatteners of this invention, many gradient index rod lenses are designed and fabricated with small changes in pitch length. This embodiment can produce a large variety of very similar rod lenses. In some embodiments it is desired, however, to be able to take a large batch of identical rod lenses and perturb, or "tune" (select) the pitch length by small amounts in order to obtain the elements for a GRAFF.

Figure 11:
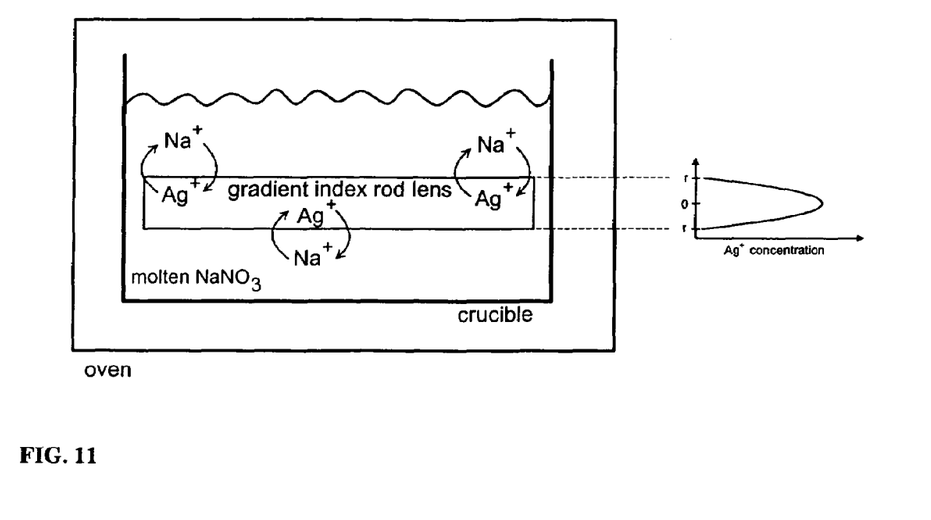
FIG. 11 is a schematic representation of the method of Gradient Tuning for an embodiment of this invention.

One embodiment of the method of fabricating GRAFF field flatteners of this invention includes the "tuning" of the gradient profile by a short customizing diffusion step, as shown in FIG. 11. This method of varying the pitch length of rod lenses uses an additional ion diffusion step to either slightly strengthen or weaken the gradient in members of a large batch of rod lenses. FIG. 11 illustrates an oven in which a molten salt bathes the rod lens. The radial gradient may be modified through a continued ion-exchange process similar to the original fabrication process (e.g., see Ref. [11]). In FIG. 11 a standard rod lens is immersed for a short period in a molten salt bath to slightly out-diffuse and hence weaken the high index gradient profile (shown at right).

As shown in FIG. 11, one method for varying the pitch length of rod lenses includes an additional ion diffusion step to tune the gradient on a large batch of rod lenses. In this method, the standard rod lens is immersed for a short period in a molten salt bath to slightly out-diffuse and hence weaken the high index gradient profile (shown at right in FIG. 11).

Another tuning method includes annealing. Small perturbations in the rod gradient profile can be obtained by simply heating the rod lens and enabling diffusion of the trapped ion species. This method may be useful for generating varied rods in the neighborhood of a standard pitch length. Other tuning methods include length variation for non-integral pitch imaging, and dispersive tuning where identical rod lenses can be used in different positions due to the change in focal length of the rod lenses with wavelength. The chromatic compensation is related to the embodiment described hereinbelow, shown in FIG. 12.

Figure 12:
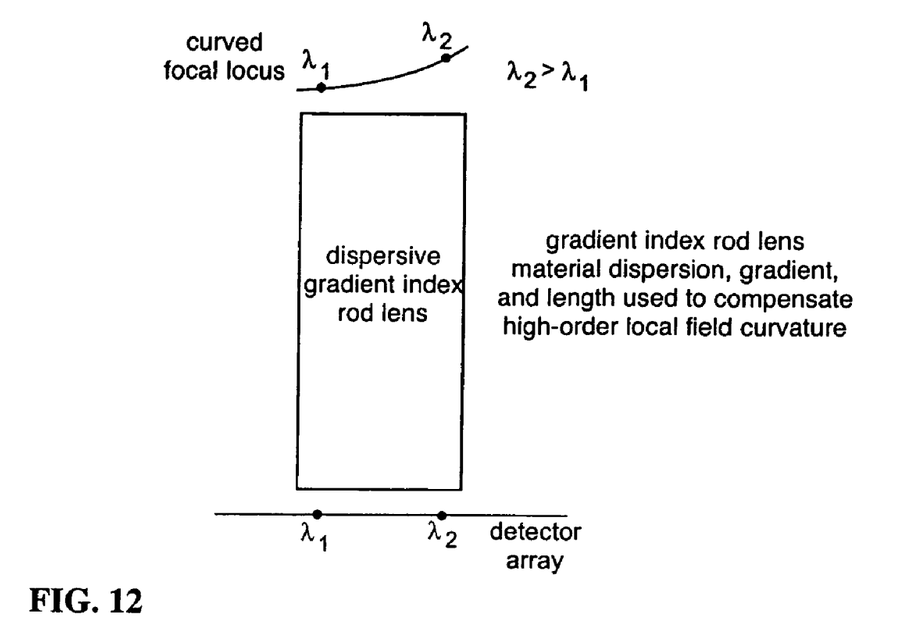
FIG. 12 represents High-Order Chromatic Tuning in an embodiment of this invention.

The natural dispersion of the rod lenses can be used advantageously in two ways. First the dispersion can be used to provide a first-order match to the local curvature of the subfield imaged by a given rod lens, as shown in FIG. 12. This method comprises matching the rate of wavelength change across the local focal locus coordinate in the dispersive system and the longitudinal chromatic aberration in the rod lens.

As with other refractive lenses, the focal length for a rod lens varies with the frequency of imaged light. This can be used to advantage in two ways. First, as shown above, the dispersion can be matched in some cases to correct for the local field curvature of the focal locus in the hyperspectral plane, since wavelength is varied along the locus. Alternatively, for lower dispersion systems, identical rods can be used at multiple locations in the GRAFF where the spectrally varying focal lengths of the rod lens match the sag of the field to be corrected. The latter case relaxes the need to produce many closely-spaced rod lenses.

It should be noted that, although the above described embodiments image a focal locus of the received electromagnetic radiation onto a plane, this invention is not limited to those embodiments. The embodiments that image a focal locus of the received electromagnetic radiation onto a plane are exemplary. The embodiments of this invention image a focal locus of the received electromagnetic radiation onto another focal locus of the image surface.

It should also be noted that, although the above described embodiments image a focal locus of the received electromagnetic radiation onto a plane and the end facet is planar, an end facet of one or more gradient index rod lenses can be shaped in order to substantially match locally the focal locus of the image surface.

Although the invention has been described with respect to various embodiments, it should be realized this invention is also capable of a wide variety of further and other embodiments within the spirit and scope of the appended claims.

What is claimed is:

1. An optical system comprising:
   a plurality of gradient index rod lenses arranged in an array;
   in said array, each gradient index rod lens from said plurality of gradient index rod lenses is substantially in proximity with at least one other gradient index rod lens from said plurality of gradient index rod lenses;
   each one of said plurality of gradient index rod lenses having predetermined characteristics, said predetermined characteristics comprising a predetermined length, a predetermined index gradient, and a predetermined width;
   at least two gradient index rod lenses from said plurality of gradient index rod lenses having different predetermined characteristics;
   said array being capable of receiving electromagnetic radiation and of imaging the received electromagnetic radiation onto an image surface;
   said predetermined characteristics of each gradient index rod lens from said plurality of gradient index rod lenses being selected in order to image a focal locus of the received electromagnetic radiation onto another focal locus of the image surface; a receiving surface from said plurality of gradient index rod lenses receiving electromagnetic radiation emanating from said focal locus; said receiving surface including surfaces from at least two gradient index rod lenses from said array of gradient index rod lenses; at least one focal locus from said focal locus of the received electromagnetic radiation and said another focal locus of the image surface being a curved focal locus.

2. The optical system of claim 1 wherein a gradient profile of each gradient index rod lens is selected in order to image the received electromagnetic radiation onto the image surface with substantially unity magnification.

3. The optical system of claim 2 wherein the received electromagnetic radiation is imaged onto the image surface substantially without inversion.

4. The optical system of claim 1 wherein a non-integral pitch is selected for each gradient index rod lens.

5. The optical system of claim 1 wherein an integral pitch is selected for each gradient index rod lens.

6. The optical system of claim 1 wherein a receiving facet of at least one gradient index rod lens is shaped in order to substantially match the focal locus of the received electromagnetic radiation.

7. The optical system of claim 1 wherein an end facet of at least one gradient index rod lens is shaped in order to substantially match the focal locus of the image surface.

8. The optical system of claim 1 wherein a receiving facet of each gradient index rod lens is angled in order to refract a chief ray, from the received electromagnetic radiation, towards an axis of said each gradient index rod lens.

9. The optical system of claim 1 wherein each gradient index rod lens is shaped in order to render a cross sectional area substantially the same as a tileable shape.

10. The optical system of claim 1 wherein an index gradient of at least one gradient index rod lens from said plurality of gradient index rod lenses is tuned in order to obtain the predetermined characteristics.

11. The optical system of claim 10 wherein the gradient is tuned by additional ion diffusion.

12. The optical system of claim 10 wherein the gradient is tuning by thermal annealing.

13. The optical system of claim 1 wherein at least one gradient index rod lens is curved.

14. The optical system of claim 1 wherein said focal locus of the received electromagnetic radiation is a curved focal locus and said another focal locus of the image surface is a substantially flat focal locus.

15. The optical system of claim 14 wherein a substantially flat detector array is substantially located at said substantially flat focal locus.

16. A method for modifying a focal locus of an electromagnetic radiation field, the method comprising the steps of:
   receiving the electromagnetic radiation at a receiving surface of an array of gradient index rod lenses; said receiving surface including surfaces from at least two gradient index rod lenses from said array of gradient index rod lenses;
   selecting at least one characteristic of each gradient index rod lens from the array of gradient index rod lenses in order to image a focal locus of the received electromagnetic radiation onto a focal locus of an image surface; at least one focal locus from said focal locus of the received electromagnetic radiation and said focal locus of the image surface being a curved focal locus; and,
   imaging the received electromagnetic radiation onto the image surface;
   wherein characteristics of each gradient index rod lens comprise a length, an index gradient, and a width.

17. The method of claim 16 further comprising the step of:
   selecting a gradient profile of each gradient index rod lens from the array of gradient index rod lenses in order to image the received electromagnetic radiation onto the image surface with substantially unity magnification.

18. The method of claim 17 wherein the received electromagnetic radiation is imaged onto the image surface substantially without inversion.

19. The method of claim 16 further comprising the step of:
   selecting a non-integral pitch for each gradient index rod lens from the array of gradient index rod lenses.

20. The method of claim 16 further comprising the step of:
shaping a receiving facet of each gradient index rod lens in order to substantially match the focal locus of the curvature from the received electromagnetic radiation.

21. The method of claim 16 further comprising the step of:
angling a receiving facet of each gradient index rod lens in order to refract a chief ray, from the received electromagnetic radiation, towards an axis of each gradient index rod lens.

22. The method of claim 16 further comprising the step of:
shaping each gradient index rod lens in order to render a cross sectional area substantially the same as a tileable shape.

23. The method of claim 16 further comprising the step of:
tuning an index gradient of at least one gradient index rod lens from the array of gradient index rod lenses.

* * * * *